(12) United States Patent
Block et al.

(10) Patent No.: US 8,370,100 B2
(45) Date of Patent: Feb. 5, 2013

(54) METHOD FOR DETERMINING WHEN TO PERFORM A TEST OF AN OVERSPEED PROTECTION SYSTEM OF A POWERPLANT MACHINE

(75) Inventors: Frederick William Block, Campobello, SC (US); Richard Lee Nichols, Simpsonville, SC (US); Joseph Robert Law, Greer, SC (US); Bret Stephen Dalton, Greer, SC (US); George Allen Ellis, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 12/729,654

(22) Filed: Mar. 23, 2010

(65) Prior Publication Data

US 2011/0238358 A1 Sep. 29, 2011

(51) Int. Cl.
*G01M 1/00* (2006.01)
*G04F 1/00* (2006.01)
*G04F 7/02* (2006.01)
*G04F 7/10* (2006.01)

(52) U.S. Cl. ......... 702/113; 702/176; 702/177; 702/179

(58) Field of Classification Search ............. 702/34, 702/42, 56, 58, 63, 113, 163, 182, 183, 185; 73/660; 361/23; 431/12
See application file for complete search history.

(56) References Cited

U.S. PATENT DOCUMENTS

| | | | | |
|---|---|---|---|---|
| 5,365,787 A * | 11/1994 | Hernandez et al. | ............. | 73/660 |
| 6,075,685 A * | 6/2000 | Reed et al. | ............. | 361/23 |
| 6,095,793 A * | 8/2000 | Greeb | ............. | 431/12 |
| 7,355,828 B2 * | 4/2008 | Jones | ............. | 361/51 |
| 7,677,089 B2 * | 3/2010 | Block et al. | ............. | 73/112.01 |
| 7,716,971 B2 * | 5/2010 | Block et al. | ............. | 73/112.01 |
| 2007/0013365 A1 | 1/2007 | Jones | | |

* cited by examiner

*Primary Examiner* — Mohamed Charioui
*Assistant Examiner* — Felix Suarez
(74) *Attorney, Agent, or Firm* — Cantor Colburn LLP (57) ABSTRACT

Embodiments of the present invention have the technical effect of determining when to test an overspeed protection system of a powerplant machine. As described herein, embodiments of the present invention may be applied to a wide variety of powerplant machines, each comprising a shaft. After determining that test of the overspeed protection system should be performed, embodiments of the present invention may allow for a variety of methods to test the overspeed protection system.

19 Claims, 7 Drawing Sheets

METHOD FOR DETERMINING WHEN TO PERFORM A TEST OF AN OVERSPEED PROTECTION SYSTEM OF A POWERPLANT MACHINE

BACKGROUND OF THE INVENTION

This application is related to commonly-assigned U.S. patent application Ser. No. 11/584,095, filed Oct. 20, 2006; now U.S. Pat. No. 7,716,971, issued on May 18, 2010; and U.S. patent application Ser. No. 11/589,579, filed Oct. 30, 2006; now U.S. Pat. No. 7,677,089, issued on Mar. 16, 2010.

The present invention relates to a protection system of a powerplant machine; and more particularly to a method of determining when to test an overspeed protection system of the powerplant machine.

An overspeed condition occurs after the speed of a shaft on a powerplant machine exceeds a specified range. During the overspeed condition, a powerplant machine typically experiences severe mechanical and thermal stresses that can cause a catastrophic failure.

Generally, the powerplant machine is equipped with protection systems, which attempt to reduce the effects of an overspeed condition. A governor system generally serves as the primary line of protection. Upon detecting an overspeed condition, the governor attempts to decrease the speed of the shaft. There may also be a secondary, or independent line, of protection—an overspeed protection system. Typically, the overspeed protection system incorporates mechanical, electrical, and software components to safeguard the powerplant machine. An overspeed protection system protects the powerplant machine by initiating an emergency shutdown (commonly called a trip) during an overspeed event.

Powerplant operators periodically test the overspeed protection system to determine if the system is functioning properly. The interval between testing is commonly on a fixed schedule. For example, on a yearly basis.

Prior to testing the overspeed protection system, the powerplant machine is customarily operating in a full-speed-no-load (FSNL) condition. FSNL is a condition when the powerplant machine is at a normal operating speed and is not exporting energy to a load. An overspeed test typically involves manually raising the speed of a shaft above the normal operating range. For example, but not limiting of, during an overspeed test operators may raise the speed of the shaft to 110% of the normal operating speed; thereafter the overspeed protection system should trip the powerplant machine.

There are a few problems with current methods of overspeed testing. Current methods use a fixed interval for the periodic testing of the overspeed protection system. The current methods do not determine if the interval between testing may be extended because of operating conditions of the powerplant machine and associated turbine systems. These systems may include, but are not limited to: speed detection; emergency stop valve; lube oil system; hydraulic system; trip oil system; emergency trip; or protective trip. These systems are collectively referred to as "turbine systems", hereinafter.

Manually adjusting the shaft speed may introduce high thermal transients. A trip at a speed near or above the normal operating speed can introduce large mechanical, electrical, and thermal stresses on the components of the powerplant machine. These stresses decrease the maintenance interval. Moreover, after a trip, a re-start of the powerplant machine is required, which delays the exporting of energy. In addition, the current overspeed testing methods typically require that the powerplant machine operate at FSNL. This does not generate revenue but consumes fuel and electricity. These problems drive powerplant machine operators to avoid manual speed adjustments, trips, FSNL operation, and overspeed testing.

For the foregoing reasons, there is a desire for a method of testing an overspeed protection system that reduces the chance of a trip. The method should provide a condition based system, or the like, which may monitor the turbine systems. Based on the monitoring, the method should determine whether a test of the overspeed protection system should be performed. The method should be adaptable to a wide variety powerplant machines, including those integrated with others powerplant machines.

BRIEF DESCRIPTION OF THE INVENTION

In accordance with an embodiment of the present invention, a method of determining when a test of an overspeed protection system of a powerplant machine is recommended, the method comprising: providing a powerplant machine comprising a shaft and an operational control system, wherein the operational control system is configured for operating the powerplant machine and comprises an overspeed protection system configured for detecting an overspeed event associated with the shaft; providing a condition based algorithm configured for determining when a test of the overspeed protection system is recommended, wherein the condition based algorithm is integrated with the operational control system, and performs the steps of: a) monitoring a component of the powerplant machine, wherein the component is associated with the overspeed protection system; b) determining whether an interval is met; c) determining whether an operational event associated with the component has occurred; and d) adjusting the interval based on the operational event; wherein the condition based algorithm determines when the frequency of testing the overspeed protection system can be decreased.

In accordance with an alternate embodiment of the present invention, a method of testing an overspeed protection system of a powerplant, the method comprising: providing a powerplant comprising a gas turbine and a steam turbine, and wherein a shaft integrates the gas turbine and the steam turbine forming a steam and gas powertrain (STAG); providing an operational control system, wherein the operational control system is configured for operating the STAG and comprises an overspeed protection system configured for detecting an overspeed event associated with the shaft; providing a condition based algorithm configured for determining when a test of the overspeed protection system is recommended, wherein the condition based algorithm is integrated with the operational control system, and performs the steps of: a) monitoring a component of the powerplant machine, wherein the component is associated with the overspeed protection system; b) determining whether an interval is met, wherein the interval suggests when to test the overspeed protection system; c) determining whether an operational event associated with the component has occurred; and d) adjusting the interval based on the operational event; wherein the condition based algorithm determines when the frequency of testing the overspeed protection system can be decreased.

DETAILED DESCRIPTION OF THE INVENTION

The present invention has the technical effect of determining when to test an overspeed protection system of a powerplant machine. As described below, embodiments of the present invention may be applied to a wide variety of powerplant machines, each comprising a shaft. After determining that test of the overspeed protection system should be performed, embodiments of the present invention may allow for a variety of methods to test the overspeed protection system. These methods may include, but are not limited to, known methods, methods described in FIGS. 3 and 4, or the like.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted might occur out of the order noted in the FIGS. Two successive FIGS., for example, may be executed substantially concurrently or may sometimes be executed in the reverse order, depending upon the functionality/operations involved.

The present invention may be applied to many forms of powerplant machines, which may be considered a machine that transfers energy, in part by rotating a shaft. Some powerplants are configured with multiple powerplant machines, such as, but not limiting of, turbomachines, and others with rotating shafts. The powerplant configurations may include, but are not limited to, a steam turbine and a gas turbine integrated by a single shaft (commonly called a single-shaft STAG); or a multiple turbines integrated via multiple shafts. The shaft integrates multiple powerplant machines, allowing each powerplant machine to contribute to the torque that rotates the shaft. Therefore, embodiments of the present invention may be applied to a single powerplant machine comprising a single shaft; a single powerplant machine comprising multiple shafts; multiple powerplant machines integrated in a STAG configuration; or multiple powerplant machines integrated via multiple shafts.

Embodiments of the present invention may apply to a wide variety of powerplant machines having the form of a rotating machine such as, but not limiting of, radial, axial, centrifugal machines in open and/or closed systems. This may include, but is not limited to, the following: axial turbines, axial compressors, centrifugal compressors, helical screw compressors, radial-inflow turbines, torque converters, pumps, fans, blowers, hydraulic turbines, marine propellers, wind turbines, or any combination thereof.

The powerplant machine may also have the form of a turbomachine configured for producing power and/or consuming power. These turbomachines may include, but are not limited to, combustion turbines and steam turbines. These turbomachines may primarily function to increase pressure of a working fluid. Non-limiting examples of the working fluid including: air, water, gas, physical matter, or any combination, thereof. These turbomachines may consume a wide variety of energy sources, such as, but not limiting of, gas, liquid fuel, air, water, vapor, wind, electricity, thermal, steam, or any combination thereof.

Embodiments of the present invention may be applied to powerplant machines operating in a wide variety of applications including, but not limited of, the following: aerospace, automotive, refrigeration, heating, industrial, power generation, marine, chemical, agricultural, petrochemical, mechanical drives, pumps, fans blowers, compressors, and the like.

Figure 1:
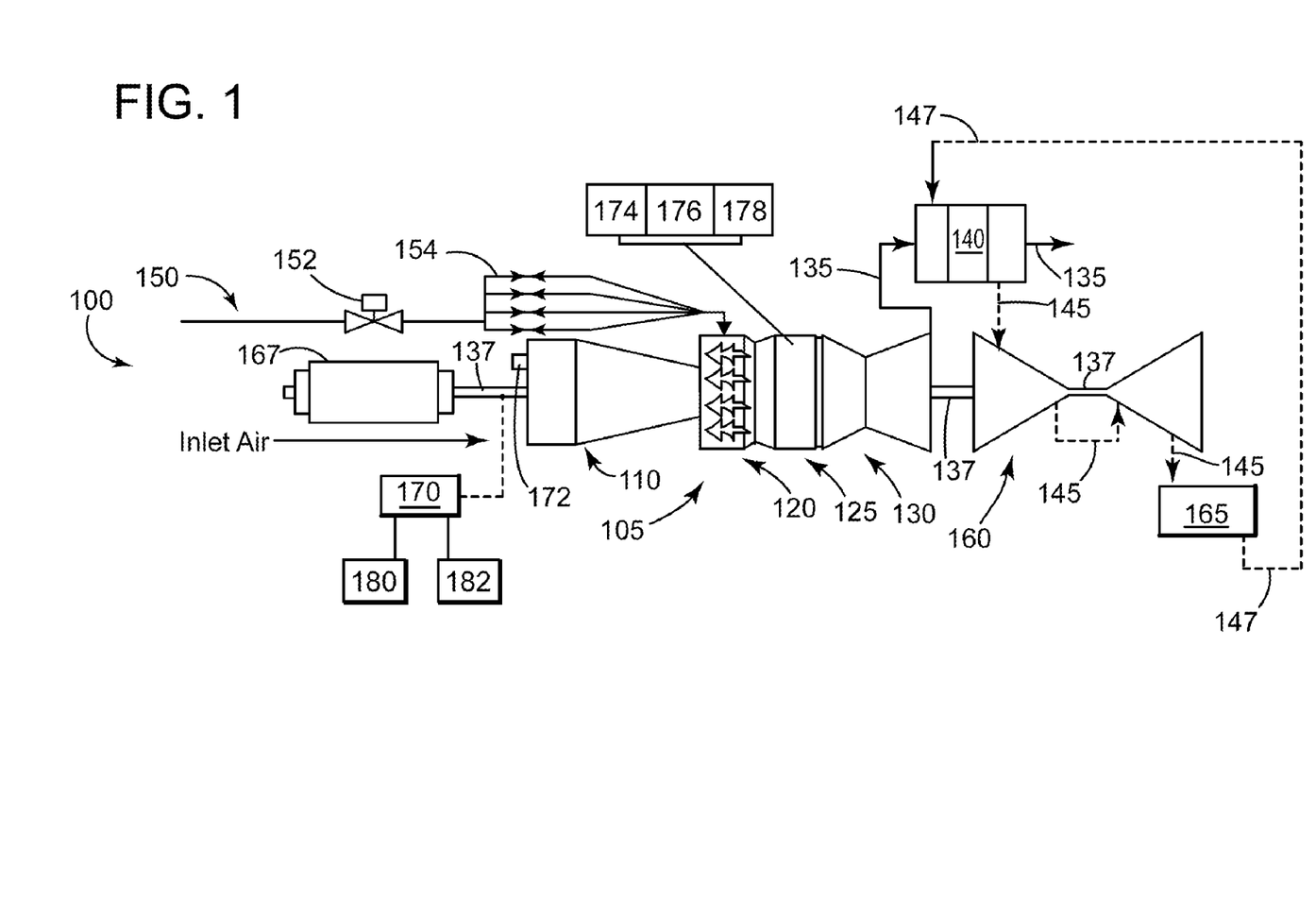
FIG. 1 is a schematic illustrating the environment in which an embodiment of the present invention operates.

Referring now to the FIGS., where the various numbers represent like elements throughout the several views, FIG. 1 is a schematic illustrating an environment in which an embodiment of the present invention may operate. FIG. 1 illustrates a powerplant 100, in a combined cycle configuration, having a gas turbine 105 and a steam turbine 160. A shaft 137 integrates the gas and steam turbines, 105,160. This configuration is considered a single-shaft STAG powertrain. Although, the embodiments of the present invention are described herein with reference to a single-shaft STAG application, the present invention may be applied to other powerplant configurations. Embodiments of the present invention may be applied to a single powerplant machine comprising a single shaft; a single powerplant machine comprising multiple shafts; or multiple powerplant machines integrated via multiple shafts.

The gas turbine 105 generally comprises a compressor section 110, a combustion system 120, a turbine section 125, and an exhaust section 130. Generally, the compressor 110 ingests and compresses an inlet air, represented by an arrow in FIG. 1. The compressed air may flow downstream to the combustion system 120, where the compressed air is mixed with a fuel, such as, but not limiting of, a natural gas, received from the gas fuel system 150, and is then combusted. The gas fuel system 150 may comprise a stop/speed ratio valve 152, and a plurality of gas control valves 154. The energy released during the combustion process flows downstream and drives the turbine section 125. A load, such as, but not limiting of, a generator 167 may be coupled to the gas turbine 105 via the shaft 137. Here, the mechanical torque generated in the turbine section 125 drives the generator 167.

The exhaust 135 generated during the operation of the gas turbine 105 may flow downstream through an exhaust section 130 and may be received by a heat recovery steam generator (HRSG) 140. The HRSG 140 utilizes a heat exchanging process to transfer some of the heat in the exhaust 135 to condensate or feedwater 147, creating steam 145. The steam 145 may flow downstream to a steam turbine 160, coupled to gas turbine 105, via the shaft 137. After flowing through the steam turbine 160, the steam 145 may condense in a condensor 165, forming the condensate 147. A condensate or feedwater pump (not illustrated) may then drive the condensate or feedwater 147 into the HRSG 140, where the aforementioned process may be repeated. After flowing through the HRSG 140, the exhaust 135 may flow to the stack (not illustrated). As the steam 145 flows through the steam turbine 160, the energy of the steam 145 is transferred into mechanical torque that drives the shaft 137.

An operational control system 170 may monitor and control the operation of the powerplant 100. During an overspeed event, the operational control system 170 regulates a plurality of turbine systems with the goal of reducing the effects of the event. These turbine systems may include, but are not limited to: speed detection 172; stop speed/ratio valve 152; lube oil system 174; hydraulic system 176; trip oil system 178; emergency trip 180; or protective trip 182.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program. Any suitable computer readable medium may be utilized.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory. These instructions can direct a computer or other programmable data processing apparatus to function in a particular manner. This is such that the instructions stored in the computer-readable memory produce an article of manufacture including instruction means which implement the function/act specified in the flowchart and/or block diagram block or blocks. The computer program instructions may also be loaded onto a computer or other programmable data processing apparatus. These instructions may cause a series of operational steps to be performed on the computer or other programmable apparatus to produce a computer implemented process. Here, the instructions, which execute on the computer or other programmable apparatus, provide steps for implementing the functions/acts specified in the flowchart and/or block diagram blocks.

Figure 2:
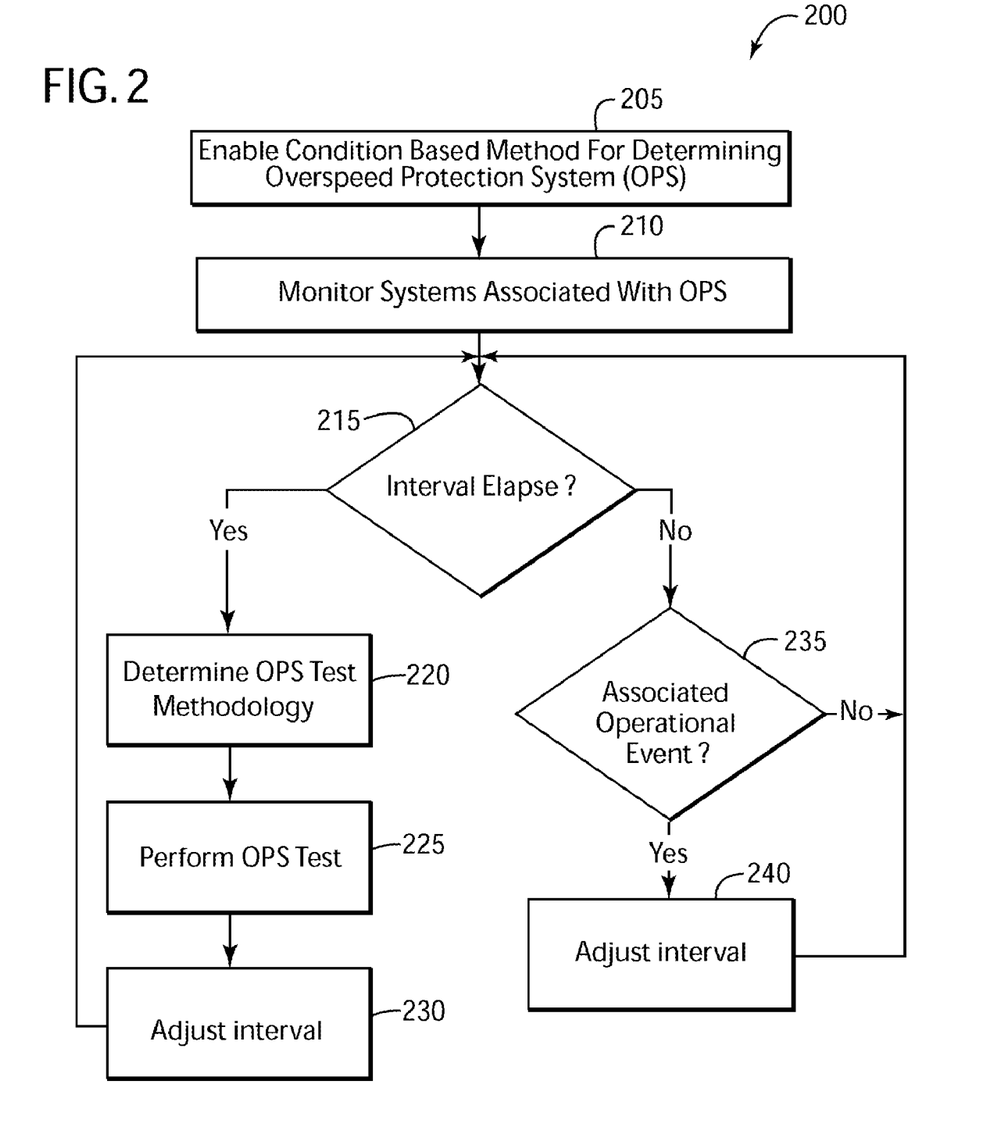
FIG. 2 is a schematic illustrating a method of determining when to test an overspeed protection system in accordance with an embodiment of the present invention.

Referring again to the FIGS., FIG. 2 is a schematic illustrating a method 200 of determining when to test an overspeed protection system in accordance with an embodiment of the present invention. In an embodiment of the present invention, an operator may use the operational control system 170 to monitor and/or control the operation of the method 200, via a graphical user interface (GUI) or the like.

Embodiments of the present invention incorporate a condition based approach to determine when the test should occur. Here, the turbine systems may be monitored to determine frequency of use, operation, and functionality. For example, but not limiting of, the speed detection system may be monitored to determine the usage, and frequency of operation. The monitoring may determine that the speed detection recently operated in a manner similar to testing what may occur during testing. If the same is true for the other turbine systems, then a test of the overspeed protection system may be prolonged.

In step 205, the condition based method for determining when to perform a test of the overspeed protection system may be enabled. The condition based method may be operated and controlled by the overspeed protection system 170. In an embodiment of the present invention, the condition based method may be continuously enabled and operate in the background.

In step 210, the method 200 may monitor the turbine systems as described.

In step 215, the method 200 may determine when an interval, which determines when a test of the overspeed protection system should be performed, has elapsed. Embodiments of the present invention allow the interval to adjust, or possibly eliminate, a fixed schedule of testing the overspeed protection system.

If the interval has elapsed then the method 200 may proceed to step 220; otherwise the method 200 may proceed to step 235.

In step 220, the method 200 may determine the methodology used to test the overspeed protection system. Embodiments of the method 200 may allow a user to select the methodology for testing the overspeed protection system. Some powerplants may incorporate multiple methodologies. These may include, but are not limited to: a) a known methodology that trips the powerplant machine; b) a methodology that performs the testing while the powerplant machine is shutting down; or c) a methodology that does not trip the powerplant machine. After selecting the testing methodology, the method 200 may proceed to step 225. Embodiments of the present invention may be applied to a powerplant that has one testing methodology. Embodiments of the present invention may also be applied to a powerplant that has more than one testing methodology.

In step 225, the test of the overspeed protection system may be performed. Here, the operational control system 170 may perform the overspeed test under the methodology of step 220.

In step 230, the method 200 may adjust the interval of step 215. This feature may extend the period between testing. This feature allows a powerplant machine to operate beyond the fixed schedule of testing.

In step 235, the method 200 may determine whether an associated operational event has occurred. As discussed, embodiments of the present invention allow for adjusting, or possibly eliminating, a fixed schedule of testing the overspeed protection system. An interval may adjust or replace the fixed schedule. In an embodiment of the present invention, the interval may take the form of: time duration, a component counter, or an event counter.

The time duration may be temporally related and associated with the type of methodology used to test the overspeed protection system. For example, but not limiting of, the time duration may be a 12 month interval for methodologies that do not trip the powerplant machine during testing; and the time duration may be a 24 month interval for methodologies that do trip the powerplant machine during testing.

The component counter may be a counter based on the operation of a component that is part of at least one of the turbine systems. The components may have the form of: a valve, a speed sensor, a governor, a temperature device, a pressure device, or combinations thereof. In an embodiment of the present invention, the component counter may increment after the valve is stroked. This may indicate that the valve is functional across the stroked range, and may decrease the need for the valve to be tested.

The event counter may be a counter based on an event affecting the operation of the powerplant 100. For example, but not limiting of, a load rejection may have occurred within a week of the scheduled test of the overspeed protection system. Here, the scheduled test may not be necessary due to the use of the turbine systems during the load rejection.

If the method 200 determines that an associated operational event has occurred, then the method 200 may proceed to step 240; otherwise the method 200 may revert to step 215.

In step 240, the method 200 may adjust the interval of step 215 based on the associated operational events(s) of step 235. This feature may extend the period between testing. This feature allows a powerplant machine to operate beyond the fixed schedule of testing.

FIGS. 3 and 4 illustrate examples of different methodologies that may be used to test the overspeed protection system of the powerplant machine. As discussed, embodiments of the present invention may be incorporated with a wide variety of testing methodologies. The discussion below is not intended to limit the scope of the present invention to only powerplant machines that incorporate the testing methodologies described herein.

Figure 3A:
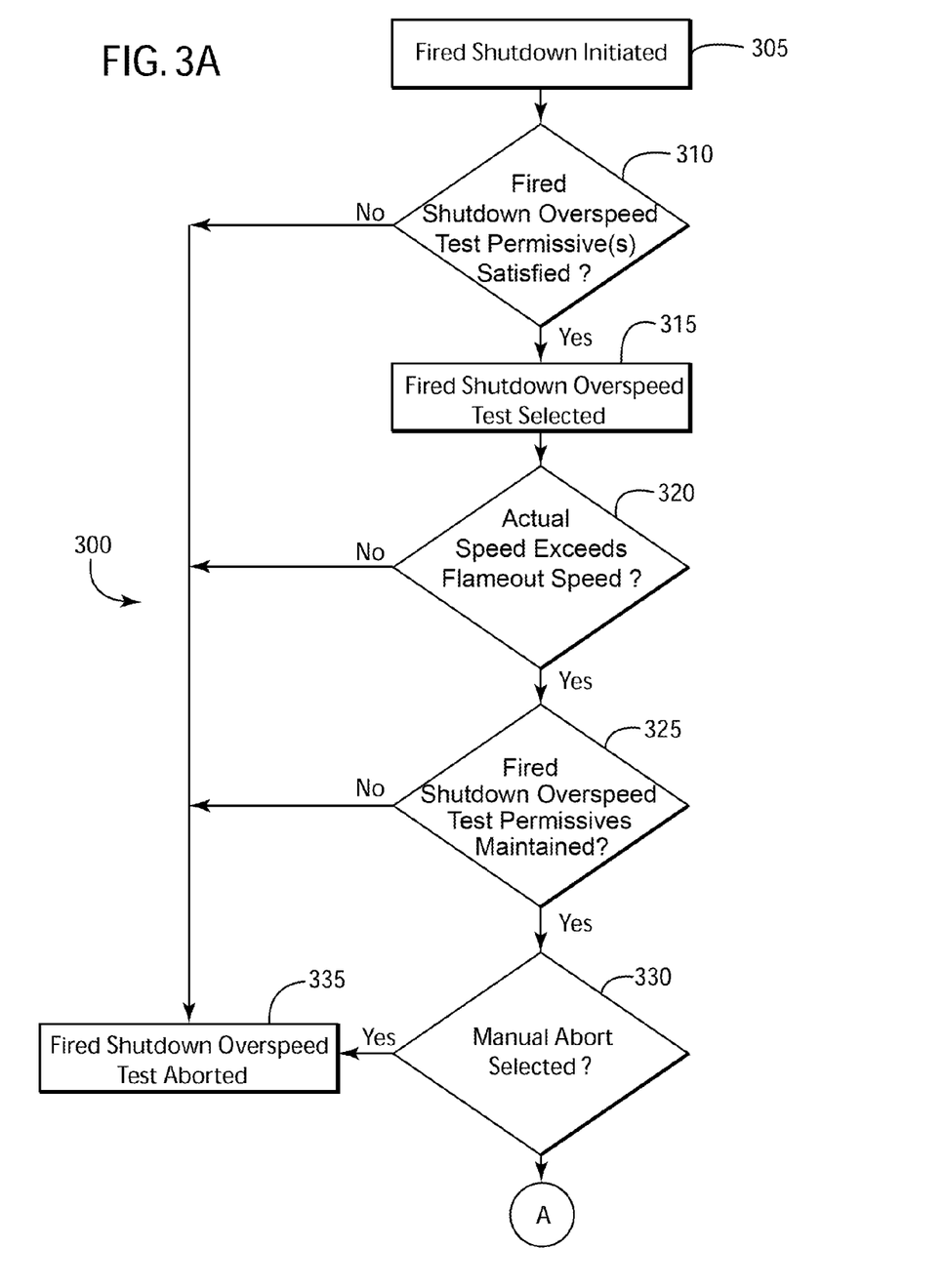
FIGS. 3A-3B (collectively FIG. 3) are flowcharts illustrating an example of a method of testing an overspeed protection system.
Figure 3B:
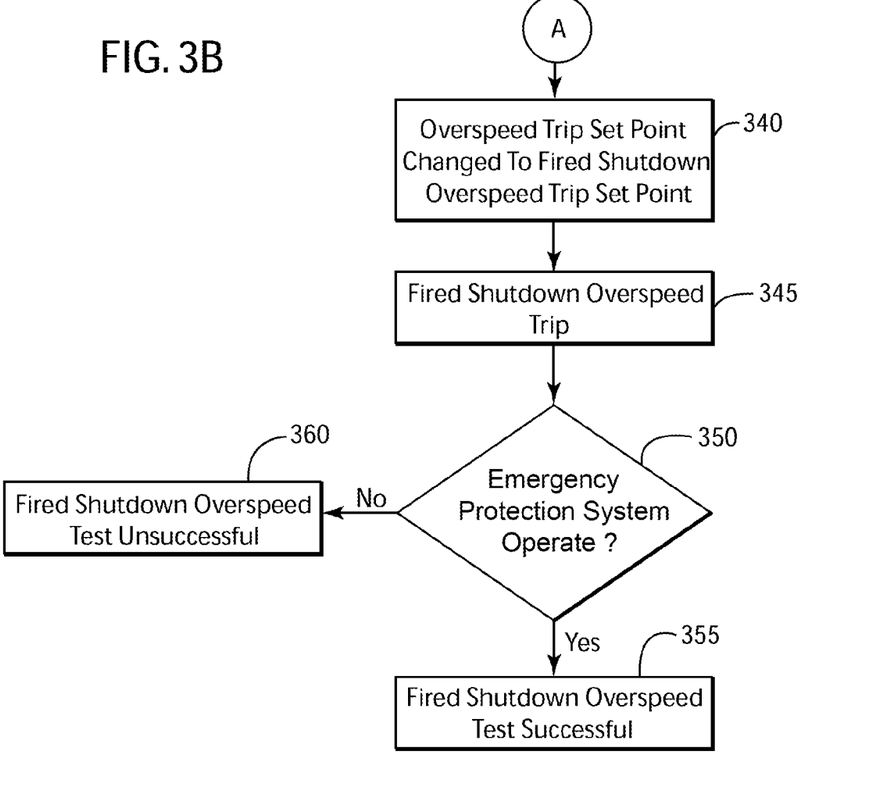

Referring now to FIGS. 3A and 3B (collectively FIG. 3), which are a flowchart illustrating a method 300 of testing an overspeed protection system during a shutdown sequence, in accordance with an embodiment of the present invention.

In step 305, a fired shutdown of the gas turbine 105 is initiated. The fired shutdown may be initiated manually by an operator or automatically by a control system with requisite privileges.

In step 310, the method 300 determines whether at least one fired shutdown overspeed test permissive is satisfied. A user may configure a plurality of permissives that are prerequisites to testing. These permissives may be used to ensure a specific operating state prior to testing. For example, but not limiting of, a user may prefer that the gas turbine is operating at or near a FSNL state prior to commencing the testing. If a required testing permissive is not satisfied, then the method 300 may proceed to step 335; otherwise the method 300 may proceed to step 315.

In step 315, the fired shutdown overspeed test is selected. A user may configure the method 300 to automatically select the test after step 310 is satisfied. A user may desire this option if the operation of the gas turbine is conducted remotely. In the alternative, a user may prefer to manually select the test, which may be desirable if the operation of the turbine is conducted locally.

The method 300 may then proceed to step 320, which may determine if the actual speed of the shaft exceeds the combustor flameout speed. If the actual speed exceeds the flameout speed, then the method 300 may proceed to step 325; otherwise the method 300 may proceed to step 335. The present invention allows the user to configure a parameter for determining the combustor flameout speed. For example, a user may set the combustor flameout speed as a control constant. Alternatively, the present invention allows the combustor flameout speed to be a variable automatically determined during testing.

The method 300, in step 325, determines whether the test permissive of step 310 is maintained. Operational events may cause the test permissive to change state. For example, a fuel system issue may lead to a premature flameout and loss of the test permissive. If the test permissive is not maintained, then the method 300 may proceed to step 335; otherwise the method 300 may proceed to step 330.

In step 330 the user may manually abort the test. A user may discover a reason, operationally or otherwise, for aborting the test. For example, a user may discover that a flame detector is not providing a reliable indication of flame status; and flame status may be an important testing requirement. If the user aborts the test, then the method 300 may proceed to step 335; otherwise the method 300 may proceed to step 340.

In step 335, the method 300 aborts the test. After the test is aborted, the gas turbine operation reverts to the previous fired shutdown sequence. A user may configure the method 300 to provide a notification that the testing was aborted. The notification may be an alarm of varying forms such as, but not limited to, an audio signal, a graphic, or a text message.

In step 340, illustrated in FIG. 3B, the overspeed trip set point is changed to a fired shutdown trip set point. The value of the fired shutdown trip set point may be influenced by a variety of mechanical, operational, and reliability factors. These factors may vary among powerplant machine types, combustion systems, operational conditions, fuel types, etc. The value is typically set to near the natural flameout speed of the particular combustion system, thereby minimizing the thermal transients associated with a trip. An embodiment of the present invention allows the user to input the fired shutdown trip set point value, thereby providing an adjustment means for specific conditions. Alternatively, the present invention may be configured to automatically generate, and input a value for the fired shutdown trip set point.

After the overspeed trip set point is changed, the method 300 may proceed to step 345. Here, the gas turbine may experience a fired shutdown overspeed trip. The trip may occur after the actual speed of the gas turbine is near the fired shutdown overspeed set point.

The method 300, in step 350, may then determine whether the emergency protection system functioned correctly. In a gas turbine, the emergency protection system generally operates to rapidly stop the fuel flow to the combustion system, thereby extinguishing combustion. Data recording means are typically used to verify that the components of the emergency protection system operated correctly. If the emergency protection system functioned correctly, then the method 300 may proceed to step 360, where the fired shutdown test is successful; otherwise the method 300 may proceed to step 355, where the fired shutdown test is unsuccessful. The present invention may be integrated with an alarm system that notifies the user whether or not the emergency protection system functioned correctly.

Figure 4A:
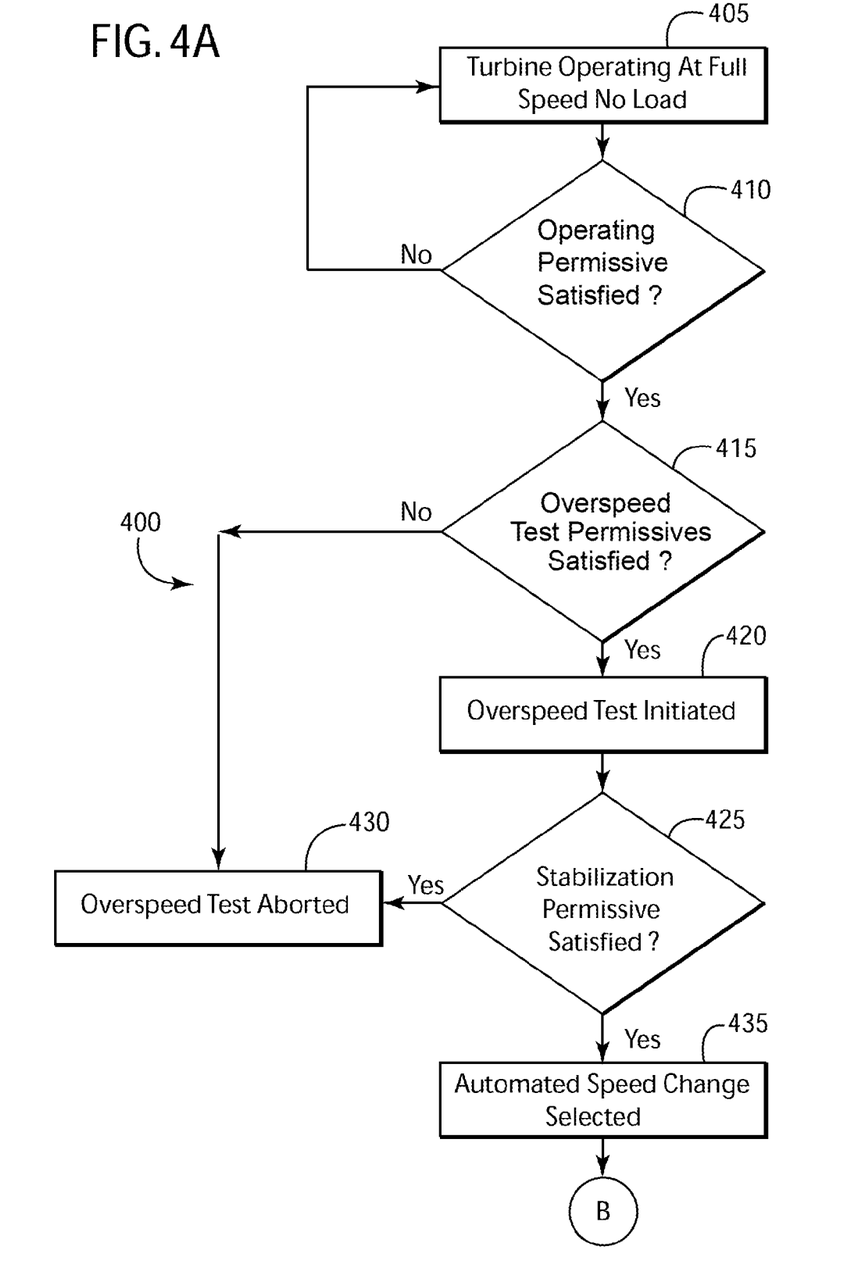
FIGS. 4A and 4B (collectively FIG. 4) are flowcharts illustrating an example of a second method of testing an overspeed protection system.
Figure 4B:
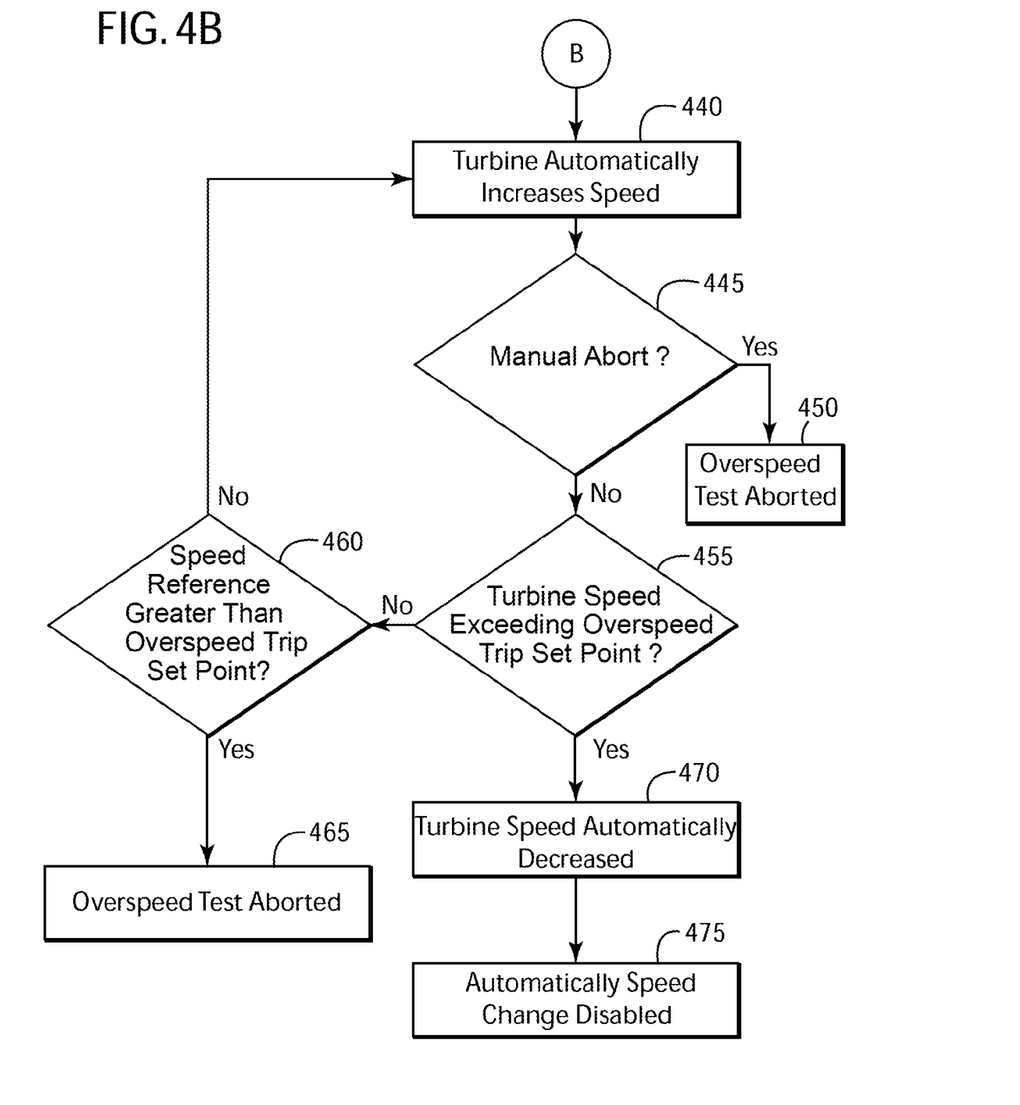

Referring now to FIGS. 4A and 4B (collectively FIG. 4), which are a flowchart illustrating the steps for a method 400 of testing an overspeed protection system of a turbine while the gas turbine initially operates at FSNL.

In an embodiment of the present invention, an operator may use the operational control system to monitor and/or control the operation of the method 400, via a graphical user interface (GUI) or the like.

The method 400 may include a biasing system or the like which adjusts the default set points of the overspeed protection system trip and an emergency protection system trip. The biasing system may allow the speed of the gas turbine to increase to the default setting of the overspeed trip set point, without tripping the gas turbine. This may ensure that the overspeed protection system is tested at the default setting of the overspeed trip set point. Furthermore, an embodiment of the method 400 may not disable the overspeed protection system or the emergency protection system. For example, but not limiting of, during testing, the biasing system may increase the emergency trip set point from 110% to 111% and the protection trip set point from 113% to 114%. Therefore, if the present invention were to malfunction, independent lines of protection may protect the gas turbine.

The present invention may require that at least one test permissive is satisfied and maintained prior to the start of the overspeed test. These permissives may include a master protective trip state; a generator/driven load status; an operating permissive; an inlet guide vane position; and a stabilization permissive. Furthermore, each permissive may be required at a different period of the overspeed test. For example, an operating permissive may be required before the testing starts, whereas the stabilization permissive may be required during the testing.

In step 405, a gas turbine may be operating at FSNL, which may be a preferable starting condition for an overspeed test. Typically, a gas turbine operates at FSNL when not exporting energy to an external load. For example, before synchronizing the generator to a utility grid, a gas turbine operates at FSNL.

In step 410, the method 400 determines if an operating permissive is satisfied. An embodiment of the present invention may allow the user to configure at least one operating permissive. The operating permissive may include continuous operation at FSNL, a soak time, or the like requirement. For example, the permissive may require a longer operation period for a new shaft. If the operating permissive is satisfied, then the method 400 may proceed to step 415; otherwise the method 400 may revert to step 405.

In step 415, the method 400 determines whether at least one overspeed test permissive is satisfied. Similar to step 410, an embodiment of the present invention may allow the user to define the overspeed test permissive or define a plurality of overspeed test permissives. For example, but not limiting of, the overspeed test permissive may include: an inlet guide vane position; a compressor protection system status; and an inlet air system status, inlet bleed heat, or the like. If the overspeed test permissive is not satisfied, then the method 400 may proceed to step 430; otherwise the method 400 may proceed to step 420.

In step 430, the method 400 may automatically abort the overspeed test. After the test is aborted, the gas turbine operation automatically reverts to FSNL. A user may configure the method 400 to provide a notification that the test was aborted. The notification may be an alarm of varying forms such as, but not limited to, an audio signal, a graphic, or a text message.

The method 400 may proceed to step 420, where the overspeed test is initiated. A user may pre-configure the method 400 to automatically initiate the overspeed test after step 415 is satisfied. A user may desire this option if, for example, the operation of the gas turbine is conducted remotely. Alternatively, the method 400 may be pre-configured to require a user action to initiate the overspeed test. The user action may be, but is not limited to, selecting an "overspeed test initiate" button, or the like, on a display where the turbine is locally controlled.

In step 425, the method 400 may determine whether a stabilization permissive is satisfied. The stabilization permissive may ensure that the gas turbine is operating near a thermal steady state with minimal heat transients. The stabilization permissive may be in the form of a timer, or the like, which counts the gas turbine operating time. Similar to steps 410 and 415, an embodiment of the present invention may allow the user to define a stabilization permissive or a plurality of stabilization permissives. Furthermore, the stabilization permissive may vary among types and/or classes of gas turbine. If the stabilization test permissive is not satisfied, then the method 400 may proceed to step 430; otherwise the method 400 may proceed to step 435.

In step 435, the method 400 may select an automatic speed increase. An embodiment of the present invention may notify the user that the method 400 is ready for an automatic speed increase. This notification may be, but is not limited to, an alarm and/or a prompt requiring a user action to proceed with the automatic speed increase. Alternatively, an embodiment of the present invention may be pre-configured to automatically select the automatic speed increase.

In step 440, the method 400 may automatically increase the speed of the shaft of the gas turbine. An embodiment of the present invention may vary the rate at which the speed increases, thereby allowing a user to minimize the thermal transients commonly associated with speed increases. The rate may vary depending on turbine class and operational environment. For example, an embodiment of the present invention may also allow the user to vary the rate during the overspeed testing to account for the momentum associated with the shaft and other mechanical components. Furthermore, a relatively faster rate may be used during lower speeds and a slower rate used as the turbine nears the overspeed trip set point.

After the automatic speed increases commence, the method 400, in step 445, may determine whether the user decides to manually abort the overspeed test. A reason for aborting the overspeed test may include, but is not limited to, operational issues. For example, the higher shaft speeds may cause a vibration concern, requiring the user to abort the test. If the user aborts the overspeed test, then the method 400 may proceed to step 450; otherwise the method 400 may proceed to step 455.

In step 450, the method 400 aborts the test. Similar to step 430, after the overspeed test is aborted, the gas turbine operation may revert to FSNL. A user may configure the method 400 to provide a notification that the overspeed test was aborted during step 445. The notification may be an alarm of varying forms such as, but is not limited to, an audio signal, a graphic, or a text message.

The present invention may incorporate a control system, turbine controller, or the like; that operates the turbine. The turbine controller may include at least one processing system, commonly called a core, which registers the speed of the turbine. An embodiment of the present invention may include a turbine controller having at least two cores, an operation core, and a protection core, or the like. The method 400, in step 455, allows the user to pre-configure each core to register the gas turbine speed. This serves to verify that the gas turbine is experiencing an overspeed condition.

The gas turbine may include a protection system that generally operates to rapidly stop the fuel flow to the combustion system, thereby extinguishing combustion. Data recording means are typically used to verify that the protection system components operated correctly during the overspeed test. The present invention may be integrated with an alarm system that notifies the user whether or not the protection system would have operated correctly in the event of a real overspeed condition.

In step 455, the method 400 may determine whether the shaft speed exceeds the overspeed trip set point. In an embodiment of the present invention, if the operation core and protection core do not register that the shaft speed exceeds the overspeed trip set point, then the method 400 may proceed to step 460; otherwise the method 400 may proceed to step 470.

An embodiment of the present invention may increase the speed of the shaft by first increasing a speed reference. The speed reference is converted to a fuel stroke reference, or the like, which eventually increases the speed of the shaft. In step 460, the method 400 determines if the turbine controller is initiating a speed reference greater than the overspeed trip set point. If the speed reference is not greater than the overspeed trip set point, then the method 400 may revert to step 440. Alternatively, if the speed reference is greater than the overspeed trip set point, then the method 400 may proceed to step 465.

In step 465, the overspeed test is aborted to avoid a trip or a catastrophic failure that may be caused by a variety of reasons. One reason for a catastrophic failure involves the thermal growth rates, which vary between the rotating and stationary turbine components. Generally, as the shaft speed increases, there is an increase in the thermal expansion of the components. Moreover, relatively tight clearances exist between the rotating and stationary turbine components, which are often made of different materials. These clearances may decrease further as the rotating and stationary components grow during the overspeed testing. Hence, to avoid a catastrophic failure resulting from contact among rotating and stationary turbine components, the method 400, in step 465 may abort the overspeed speed testing if the speed reference exceeds the overspeed trip set point, even though the turbine speed is registering below the overspeed trip set point.

In step 470, the method 400 automatically decreases the shaft speed. Similar to step 440, an embodiment of the present invention may vary the rate at which the speed decreases, thereby allowing a user to minimize the thermal transients commonly associated with speed decreases. For example, but not limiting, of the rate may vary depending on turbine class and operational environment. An embodiment of the present invention may also allow the user to vary the rate of speed decrease. For example, a relatively faster rate may be used during higher shaft speeds and a slower rate used as the shaft speed nears the normal operating speed.

The overspeed test of the present invention may be considered complete when the shaft speed returns to around the normal operating speed. In step 475, the method 400 may disable the automatic speed changes after the shaft speed returns to around FSNL.

Figure 5:
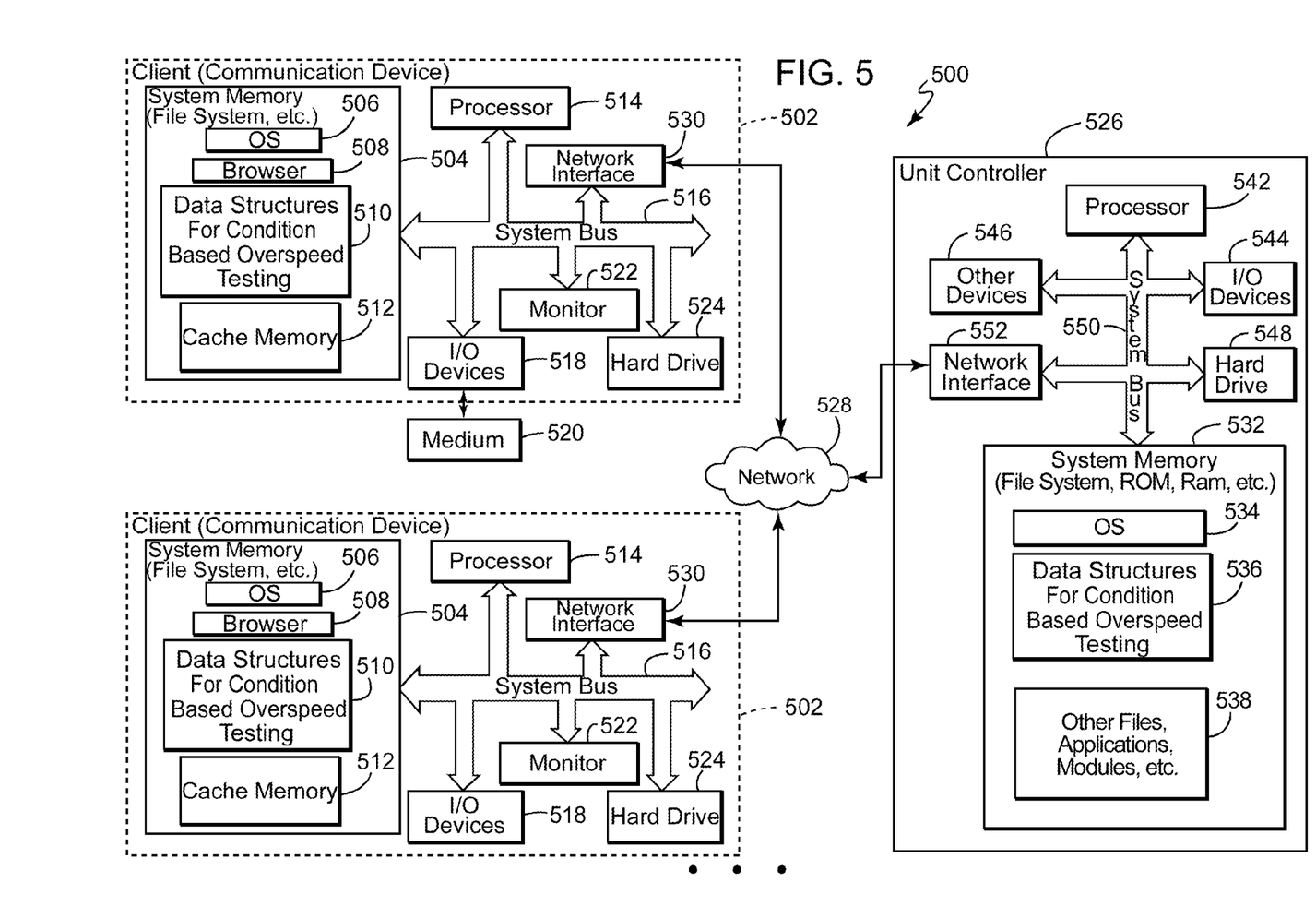
FIG. 5 is a block diagram of an exemplary system for testing an overspeed protection system in accordance with embodiments of the present invention.

FIG. 5 is a step diagram of an exemplary system 500 to determine when to test the overspeed protection system in accordance with embodiments of the present invention. The elements of the method 200 may be embodied in and performed by the system 500. The system 500 may include one or more user or client communication devices 502 or similar systems or devices (two are illustrated in FIG. 5). Each communication device 502 may be a computer system, a personal digital assistant, a cellular phone, or similar device capable of sending and receiving an electronic message.

The communication device 502 may include a system memory 504 or local file system. The system memory 504 may include a read only memory (ROM) and a random access memory (RAM). The ROM may include a basic input/output system (BIOS). The BIOS may contain basic routines that help to transfer information between elements or components of the communication device 502. The system memory 504 may contain an operating system 506 to control overall operation of the communication device 502. The system memory 504 may also include a browser 508 or web browser. The system memory 504 may also include data structures 510 or computer-executable code to determine when to test the overspeed protection system that may be similar or include elements of the method 200. The system memory 504 may further include a template cache memory 512, which may be used in conjunction with the method 200 to automatically store data from the most recent test.

The communication device 502 may also include a processor or processing unit 514 to control operations of the other components of the communication device 502. The operating system 506, browser 508, data structures 510 may be operable on the processor 514. The processor 514 may be coupled to the memory system 504 and other components of the communication device 502 by a system bus 516.

The communication device 502 may also include multiple input devices, output devices or combination input/output devices 518. Each input/output device 518 may be coupled to the system bus 516 by an input/output interface (not shown in FIG. 5). The input and output devices or combination I/O devices 518 permit a user to operate and interface with the communication device 502 and to control operation of the browser 508 and data structures 510 to access, operate and control the software to test the overspeed protection system. The I/O devices 518 may include a keyboard and computer pointing device or the like to perform the operations discussed herein.

The I/O devices 518 may also include disk drives, optical, mechanical, magnetic, or infrared input/output devices, modems or the like. The I/O devices 518 may be used to access a medium 520. The medium 520 may contain, store, communicate or transport computer-readable or computer-executable instructions or other information for use by or in connection with a system, such as the communication devices 502.

The communication device 502 may also include or be connected to other devices, such as a display or monitor 522. The monitor 522 may be used to permit the user to interface with the communication device 502. The monitor 522 present images, graphics, or the like, which may be generated by the data structures 510 for determining when to test the overspeed protection system.

The communication device 502 may also include a hard disk drive 524. The hard drive 524 may be coupled to the system bus 516 by a hard drive interface (not shown in FIG. 5). The hard drive 524 may also form part of the local file system or system memory 504. Programs, software and data may be transferred and exchanged between the system memory 504 and the hard drive 524 for operation of the communication device 502.

The communication devices 502 may communicate with a remote server 526 and may access other servers or other communication devices similar to communication device 502 via a network 528. The system bus 516 may be coupled to the network 528 by a network interface 530. The network interface 530 may be a modem, Ethernet card, router, gateway or the like for coupling to the network 528. The coupling may be a wired connection or wireless. The network 528 may be the Internet, private network, an intranet or the like.

The server 526 may also include a system memory 532 that may include a file system, ROM, RAM and the like. The system memory 532 may include an operating system 534 similar to operating system 506 in communication devices 502. The system memory 532 may also include data structures 536 to automatically test the overspeed protection system. The data structures 536 may include operations similar to those described with respect to the method 200 for automatically testing the overspeed protection system. The server system memory 532 may also include other files 538, applications, modules and the like.

The server 526 may also include a processor 542 or a processing unit to control operation of other devices in the server 526. The server 526 may also include I/O device 544. The I/O devices 544 may be similar to I/O devices 518 of communication devices 502. The server 526 may further include other devices 546, such as a monitor or the like to provide an interface along with the I/O devices 544 to the server 526. The server 526 may also include a hard disk drive 548. A system bus 550 may connect the different components of the server 526. A network interface 552 may couple the server 526 to the network 528 via the system bus 550.

The flowcharts and step diagrams in the FIGS. illustrate the architecture, functionality, and operation of possible implementations of systems, methods and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems which perform the specified functions or acts, or combinations of special purpose hardware and computer instructions.

As one of ordinary skill in the art will appreciate, the many varying features and configurations described above in relation to the several exemplary embodiments may be further selectively applied to form the other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A method of determining when a test of an overspeed protection system of a powerplant machine is recommended, the method comprising:

providing a powerplant machine comprising a shaft and an operational control system, wherein the operational control system is configured for operating the powerplant machine and comprises an overspeed protection system configured for detecting an overspeed event associated with the shaft;

providing a condition based algorithm configured for determining when a test of the overspeed protection system is recommended, wherein the condition based algorithm is integrated with the operational control system, and performs the steps of:
a) monitoring a component of the powerplant machine, wherein the component is associated with the overspeed protection system;
b) determining whether an interval is met;
c) determining whether an operational event associated with the component has occurred; and
d) adjusting the interval based on the operational event;
wherein the condition based algorithm determines when the frequency of testing the overspeed protection system can be decreased.

2. The method of claim 1 further comprising the step of selecting a methodology for performing a test of the overspeed protection system.

3. The method of claim 2 further comprising the step of conducting the test of the overspeed protection system.

4. The method of claim 3 further comprising the step of adjusting the interval after the test of the overspeed protection system.

5. The method of claim 1, wherein the component comprises at least of: a valve, a speed sensor, a governor, a temperature device, a pressure device, or combinations thereof.

6. The method of claim 5, wherein the component is integrated with at least one of the following systems:
   a. Speed detection;
   b. Emergency stop valve;
   c. Lube oil system;
   d. Hydraulic system;
   e. Trip oil system;
   f. Emergency trip; or
   g. Protective trip.

7. The method of claim 1, wherein the interval comprises at least one of: time duration, a component counter, or an event counter.

8. The method of claim 1, wherein the powerplant comprises multiple powerplant machines.

9. The method of claim 8, wherein the multiple powerplant machines comprise a gas turbine and a steam turbine, and wherein the shaft integrates the gas turbine and the steam turbine forming a steam and gas powertrain (STAG).

10. A method of testing an overspeed protection system of a powerplant, the method comprising:
   providing a powerplant comprising a gas turbine and a steam turbine, and wherein a shaft integrates the gas turbine and the steam turbine forming a steam and gas powertrain (STAG);
   providing an operational control system, wherein the operational control system is configured for operating the STAG and comprises an overspeed protection system configured for detecting an overspeed event associated with the shaft;
   providing a condition based algorithm configured for determining when a test of the overspeed protection system is recommended, wherein the condition based algorithm is integrated with the operational control system, and performs the steps of:
   a) monitoring a component of the powerplant machine, wherein the component is associated with the overspeed protection system;
   b) determining whether an interval is met, wherein the interval suggests when to test the overspeed protection system;
   c) determining whether an operational event associated with the component has occurred; and
   d) adjusting the interval based on the operational event;
   wherein the condition based algorithm determines when the frequency of testing the overspeed protection system can be decreased.

11. The method of claim 10 further comprising the step of selecting a methodology for performing a test of the overspeed protection system.

12. The method of claim 11, wherein the methodology comprises a shutdown mode procedure configured for the shutdown mode, and an operating mode procedure configured for the operating mode.

13. The method of claim 11 further comprising the step of conducting the test of the overspeed protection system.

14. The method of claim 12 further comprising the step of adjusting the interval after the test of the overspeed protection system.

15. The method of claim 10, wherein the component comprises at least of: a valve, a speed sensor, a governor, a temperature device, a pressure device, or combinations thereof.

16. The method of claim 14, wherein the component is integrated with at least one of the following systems:
   h. Speed detection;
   i. Emergency stop valve;
   j. Lube oil system;
   k. Hydraulic system;
   l. Trip oil system;
   m. Emergency trip; or
   n. Protective trip.

17. The method of claim 10, wherein the interval comprises at least one of: time duration, a component counter, or an event counter.

18. The method of claim 10, wherein the powerplant comprises multiple powerplant machines.

19. The method of claim 17, wherein the multiple powerplant machines comprise a gas turbine and a steam turbine, and wherein the shaft integrates the gas turbine and the steam turbine forming a steam and gas powertrain (STAG).

* * * * *